March 27, 1962   J. J. HEIGL ET AL   3,027,083
ANALOG DEMONSTRATOR AND PROCESS OF DEMONSTRATION
Filed Nov. 13, 1956   5 Sheets-Sheet 1

John J. Heigl
James A. Wilson     Inventors
Donald S. McArthur
By Small, Chunham & Thomas   Attorneys John J. Heigl
James A. Wilson    Inventors
Donald S. McArthur
By *Small, Dunham & Thomas*    Attorneys

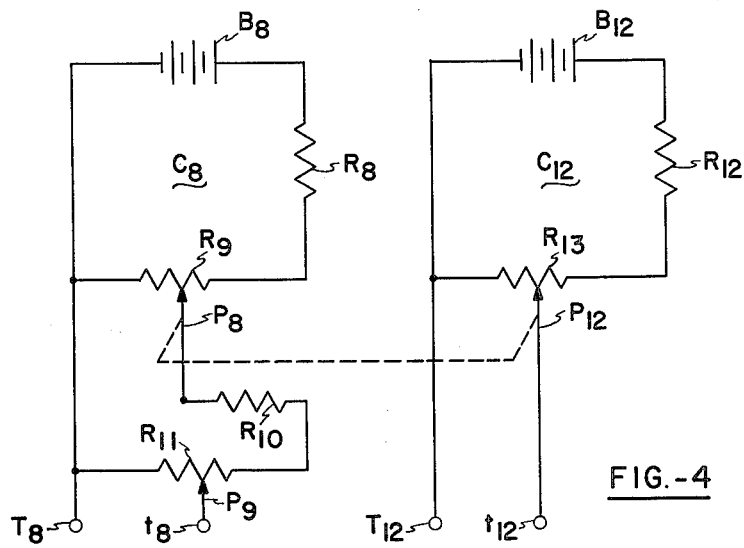
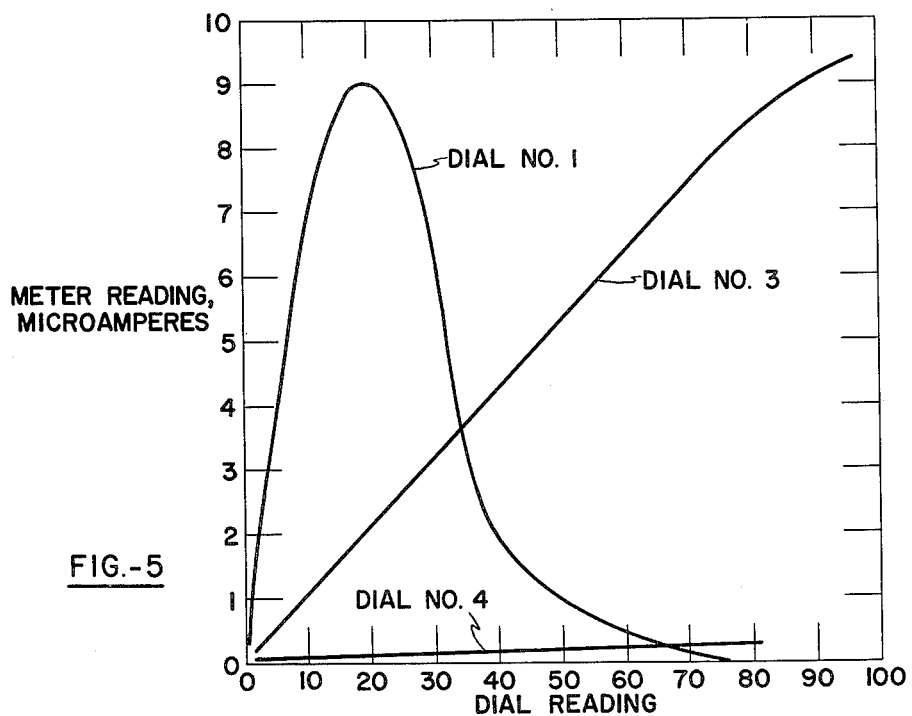
FIG.-4
FIG.-5
John J. Heigl
James A. Wilson    Inventors
Donald S. McArthur
By Small, Dunlap & Thomas Attorneys John J. Heigl
James A. Wilson   Inventors
Donald S. McArthur John J. Heigl
James A. Wilson    Inventors
Donald S. McArthur

United States Patent Office 3,027,083
Patented Mar. 27, 1962

3,027,083
ANALOG DEMONSTRATOR AND PROCESS OF DEMONSTRATION
John J. Heigl, Short Hills, James A. Wilson, Stanhope, and Donald S. McArthur, Cranford, N.J., assignors to Esso Research and Engineering Company, a corporation of Delaware
Filed Nov. 13, 1956, Ser. No. 621,763
2 Claims. (Cl. 235—184)

The present invention relates to an analog demonstrator and process of demonstration. It is applicable in general to the study of commercial operations or processes involving variables known to be significant factors bearing on the efficiency or economy of such operations or processes. It has particular application to such operations or processes where additional and unknown modifiers or variables need to be given consideration.

For example, in the study of a manufacturing process involving conversion of raw materials into more valuable products, it may be known that processing time or reaction rate, temperature and pressure all have significant effects on the efficiency of conversion. If a study is undertaken to determine the optimum combination of these variables, a relatively large number of individual test runs may be required. In such runs some of the variables may be held constant while one or two others may be varied. Even when the major variables are all known and are few in number, e.g. three or four, the number of tests needed may be quite expensive. If, as is often the case, there are additional factors such as variables which have not been isolated, but which introduce substantial error into the results so that even a large number of actual tests are inconclusive, the cost of study by experiment may well become prohibitive. The problem is further complicated by the interdependence of certain factors which commonly occur.

As a more specific example, consider the case of a theoretical chemical plant designed to make a synthetic product from certain specific raw materials. With a hypothetical optimum yield of a given percentage, the yield is assumed to be affected by five known factors, A, B, C, D and E. These might correspond respectively to temperature, pressure, feed rate, catalyst efficiency and type of diluent, for example. It is suspected that other factors such as turbulence of mixing, high purity of feed stream, etc., may have an effect since practical experience has shown that under apparently identical conditions A, B, C, D and E, the yield will vary by as much as, say, 5%. By taking into consideration this additional factor of error, which may be called F, and introducing it at various values under 5% picked from a normally distributed population (with average zero), in effect the unpredictable error may be superimposed upon the system. The present invention thus makes it possible to complete a reasonably sound economic study of the plant, even when the factor F, or means for controlling it, are completely unknown. Further specific examples are given below.

Hence it is an object of the present invention to simulate and to demonstrate by sensory indications, such as numerical readings, the effect of both known and unknown operating variables in an art, process or industry, etc.

A further object is to make realistic demonstrations of the variable effects of multiple factors of which some at least are interdependent.

A still further object is to design apparatus of relatively simple and inexpensive type for effective demonstration of dependent as well as independent variables.

A more detailed object is to construct analog or demonstration equipment with provision for taking into consideration at least one unknown or error factor along with those variable which are known or presumed to be significant. The invention involves as another object the separation of major from minor variables in the simulated study of operations, arts or processes. Such study can be carried out with substantial reduction in costs as compared with conventional test and research methods.

Thus the invention involves the provision of a simple system, involving apparatus capable of simulating commercial or industrial operations and predicting with a reasonably good degree of accuracy the effect of one or more unknown or unpredictable factors on a system of known variables. The known variables may be dependent or independent. Commonly some of both types are involved.

The invention will be more fully understood by reference to the attached drawings wherein FIG. 1 is a diagrammatic illustration of an electrical analog unit including electrical circuits embodying the invention;

FIG. 4 shows the ganging of circuits to introduce interaction between separate variables;

FIG. 5 shows relationship between dial reading and meter reading for independent and interacting variables;

Figure 1:
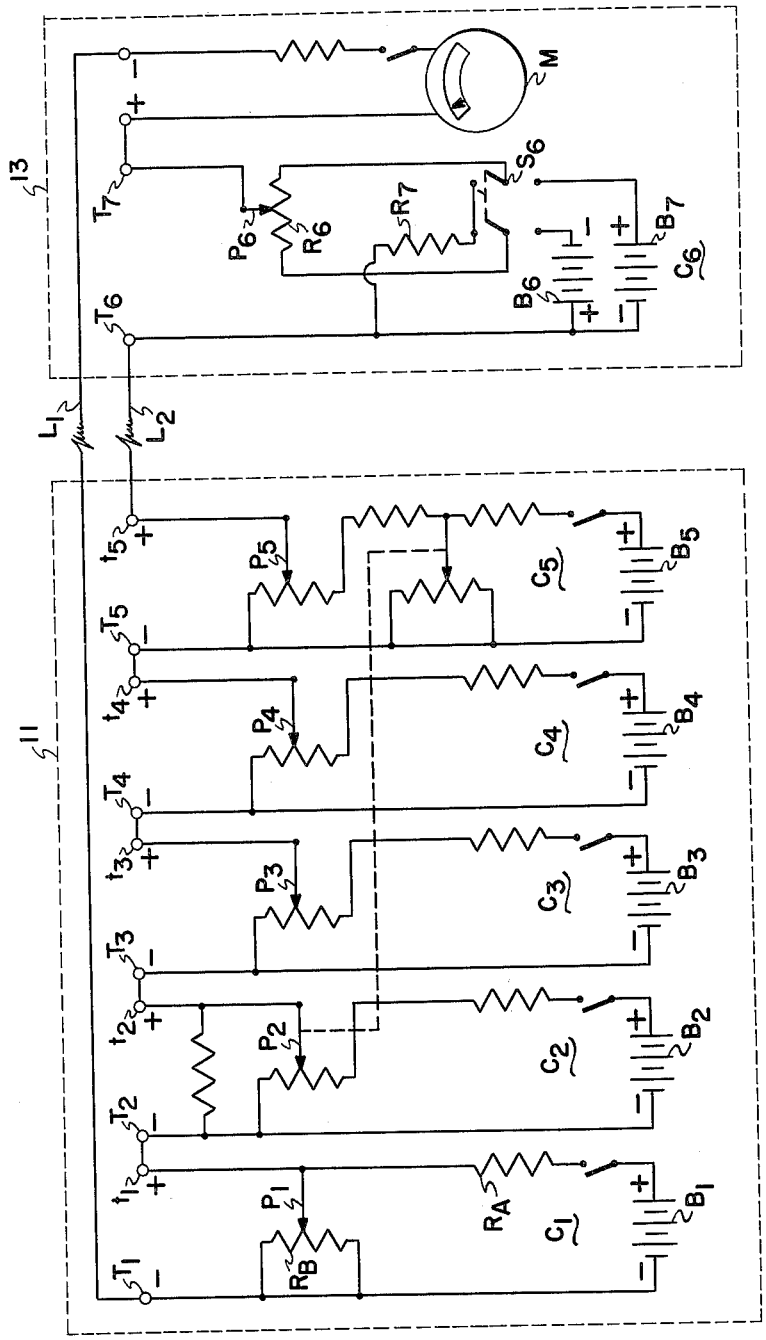

Referring now to the drawings, FIG. 1 shows a preferred arrangement of two interconnected units or boxes 11, 13, containing respectively mechanism for simulating a plurality of known variables and means for reading in a random error value. Unit 11 comprises a group of circuits designed to represent variable values. Each of these operates according to Kirchhoff's laws to produce a certain definite electrical current controlled by a dial setting. Beginning at the left, the first circuit $C_1$ comprises a battery $B_1$, a fixed resistance $R_A$, a lead line $L_1$ from the negative pole of the battery, a resistance $R_B$ in parallel with this line, and an adjustable contact or potentiometer $P_1$ adapted to adjust output voltage from circuit $C_1$ to terminals $T_1$ and $t_1$.

Figure 3:
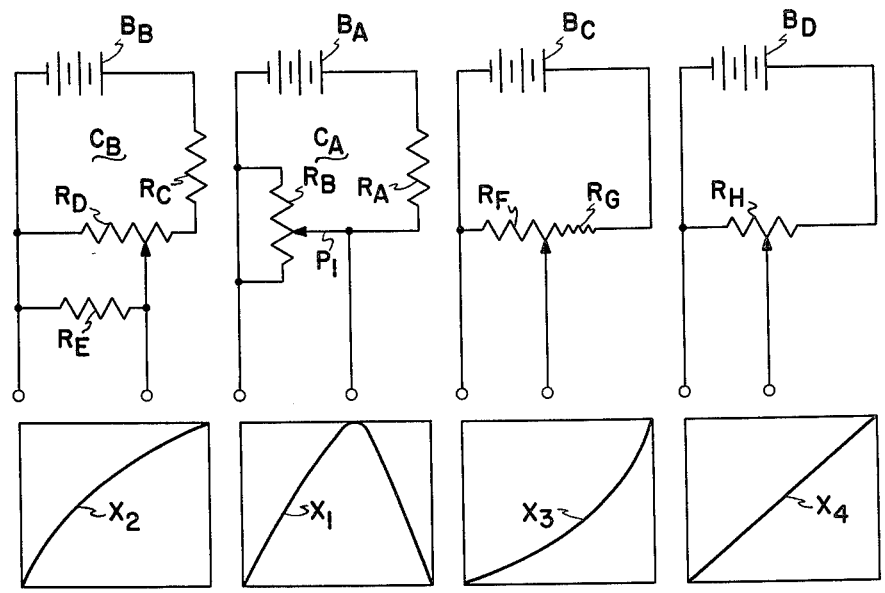
FIG. 3 shows several circuits for representing various types of functions.

Referring to FIG. 3, there are shown a group of circuits of which the second from the left, designated $C_A$ corresponds generally to circuit $C_1$ of FIG. 1. This is designed to represent a function which varies from zero value through a maximum and back to zero as the potentiometer $P_1$ is adjusted between its extremes. This unit $C_A$ is thus suitable for representing a variable that has zero effect at its extremes and maximum effect at an intermediate level. The exact shape of the curve $X_1$, FIG. 3, will depend on the nature of the winding $R_B$, whether it is uniform or variable, and on its relative magnitude compared with $R_A$.

The second circuit $C_2$ of FIG. 1 is designed to simulate a function that increases non-linearly from zero value to its maximum, with a convex bend upwardly as in curve $X_2$, FIG. 3. Circuit $C_B$ of this figure thus corresponds to $C_2$, FIG. 1. Suitable values are given resistances $R_C$, $R_D$, $R_E$, FIG. 3.

For a variable that increases slowly at first and then more rapidly, the non-uniform resistance $R_F$, $R_G$ may be provided. It does not have a counterpart in FIG. 1. Linear variables $X_4$ are represented simply by a linear potentiometer involving the simple single resistance $R_H$. Obviously, more complex functions require special types and combinations of resistances but these generally can be contrived readily by those skilled in the art. Sources of potential indicated as batteries $B_A$, $B_B$, $B_C$, $B_D$, FIG. 3, obviously can be replaced with other conventional sources.

Figure 2:
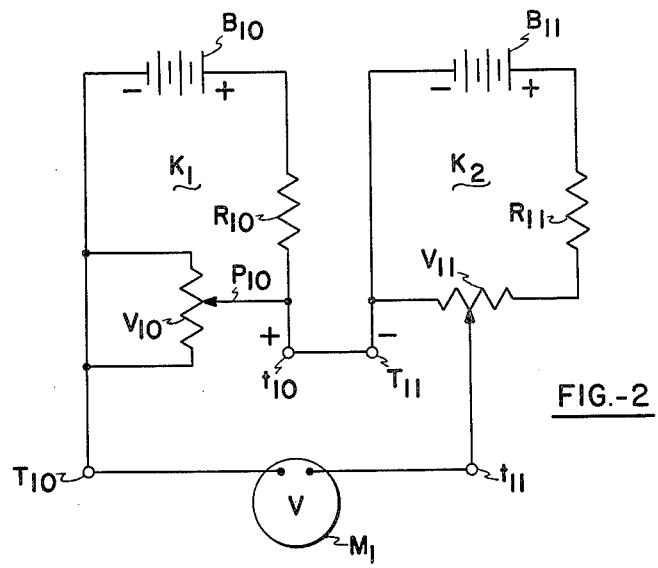
FIG. 2 is a diagrammatic view of a circuit showing two variables only.

Before proceeding further with a description of FIG. 1, reference will next be made to FIG. 2. Here are shown two interconnected circuits $K_1$ and $K_2$ whose combined output current is measured through a meter $M_1$. In circuit $K_1$ a potential source $B_{10}$ tends to cause current to flow through resistance $R_{10}$ and set up a potential between terminals $T_{10}$ and $t_{10}$. The magnitude of this potential, and possibly its direction, will vary with the setting of potentiometer $P_{10}$, $V_{10}$. At the same time circuit $K_2$ with battery $B_{11}$ supplying potential across resistances $R_{11}$ and $V_{11}$ tends to cause current to flow and sets up a potential between $T_{11}$ and $t_{11}$. If the two potentials are exactly equal and opposed, meter $M_1$ reads zero. Otherwise a voltage reading is obtained whose value and direction depends on the combined potentials of the two circuits.

Referring back now to FIG. 1, circuits $C_3$, $C_4$ and $C_5$ may all be adjusted to represent variable factors or functions whose individual characteristics are known. Assuming for the moment that all of the variables to be represented are independent, dials (not shown) may be set to desired readings in adjusting each of the variable potentiometers $P_1$, $P_2$, $P_3$, $P_4$, and $P_5$. When all are set, the total potential $T_1$, $t_5$ will be transmitted through leads $L_1$, $L_2$ to the meter box. If these leads were connected to a meter M in unit 13, it would read the cumulative effect of circuits $C_1$ to $C_5$ directly. Such a reading would have some definite value. By adjusting the five dials that control potentiometers $P_1$ to $P_5$, maximum (or minimum) readings could be obtained by trial and error. If the five circuits represent all the factors that affect an operation, for example a chemical process, this relatively simple series of adjustments would eliminate numerous and tedious computations hitherto needed for establishing, say, the conditions needed for maximum yields. The various resistances in circuits $C_2$ to $C_5$ need not be described in detail.

In many cases, however, there are other and unknown variables that also affect the end result, e.g. the yield in the case of a chemical process. In tests with a pilot plant, for example, it is often found that with even the most careful attempts to duplicate earlier runs, results are not identical. Frequently they differ rather widely. The differences are due, of course, to unknown factors or variables, i.e. "errors."

To allow for unknown variables or errors, the readout unit has in addition to its meter a circuit $C_6$. Preferably this unit 13 is sufficiently remote from unit 11 and the connections sufficiently flexible so that it can be operated and read by a separate operator. Errors or arbitrary settings for circuit $C_6$ can be introduced by this independent operator at random. In this way, direct control of the errors is taken away from the primary operator in his efforts to establish optimum conditions of the known variables. Where the errors are not too large, a working optimum may readily be obtained. If the errors are so large that the known variables are incapable of adjustment to an optimum, further research to break down the errors into known variables becomes mandatory.

As shown, circuit $C_6$ comprises batteries or equivalent sources of potential $B_6$ and $B_7$. A double pole double throw switch $S_6$ is provided for selectively completing circuits which include or exclude the batteries. With the batteries in circuit, a positive or a negative potential may be applied to a resistance $R_6$ of variable potentiometer $P_6$, depending on its setting. By reversing, the positive potential of incoming line $L_2$ is applied to resistances $R_7$ and $R_6$. Hence, potential across terminals $T_6$ and $T_7$ may be either positive or negative and of any magnitude suitable for representing errors to be read into the system. The absolute magnitude of such errors, of course, is determined experimentally by noting uncontrollable variations in data when pairs or other combinations of the known variables $C_1$ to $C_5$ are kept constant.

The potentiometer $P_6$ like $P_1$ to $P_5$, is provided with a dial (not shown) so that absolute values of the error, positive or negative, may be read at random and arbitrarily introduced into the system. The overall reading resulting from adjustment of all the known variables plus the superimposed random error, which may have any value from zero to maximum, positive or negative, is then read out on meter M. It is usually preferable to have meter M read by the error operator so that it cannot be "adjusted" by the primary operator who is striving to establish optimum values for all the known variables, the error thus being out of his control.

In FIG. 4 means are shown for operating two of the known variable circuits together. This is obviously needed when the two are known to be interdependent. Circuit $C_8$ has a battery or other source of potential $B_8$ from which current flows through resistances $R_8$, $R_9$ and through variable potentiometer $P_8$, resistances $R_{10}$ and $R_{11}$. By adjustment of potentiometer $P_9$, a desired value may be set up across terminals $T_8$ and $t_8$. In circuit $C_{12}$ a battery or source of potential supplies current to resistances $R_{12}$ and $R_{13}$ and potentiometer $P_{12}$ is variable to set up a desired value across terminals $T_{12}$ and $t_{12}$.

The potentiometers $P_8$ and $P_{12}$ are connected together, either for similar movement if the relation between the variables they represent is linear, or for movement according to some other relationship as may be required when the relation is non-linear.

Obviously 3, 4 or more variables may be linked together for simultaneous adjustment when their interdependence and their relation to each other is fully known. This type of linking obviously greatly simplifies the study and should be used wherever possible.

FIG. 5 shows graphically different functions that might be traced on dials Nos. 1, 3 and 4, corresponding to circuits such as $C_1$, $C_3$ and $C_4$. The abscissa represents the dial reading in units of 1 to 100 and the ordinate meter reading, M, in microamperes.

Figure 6:
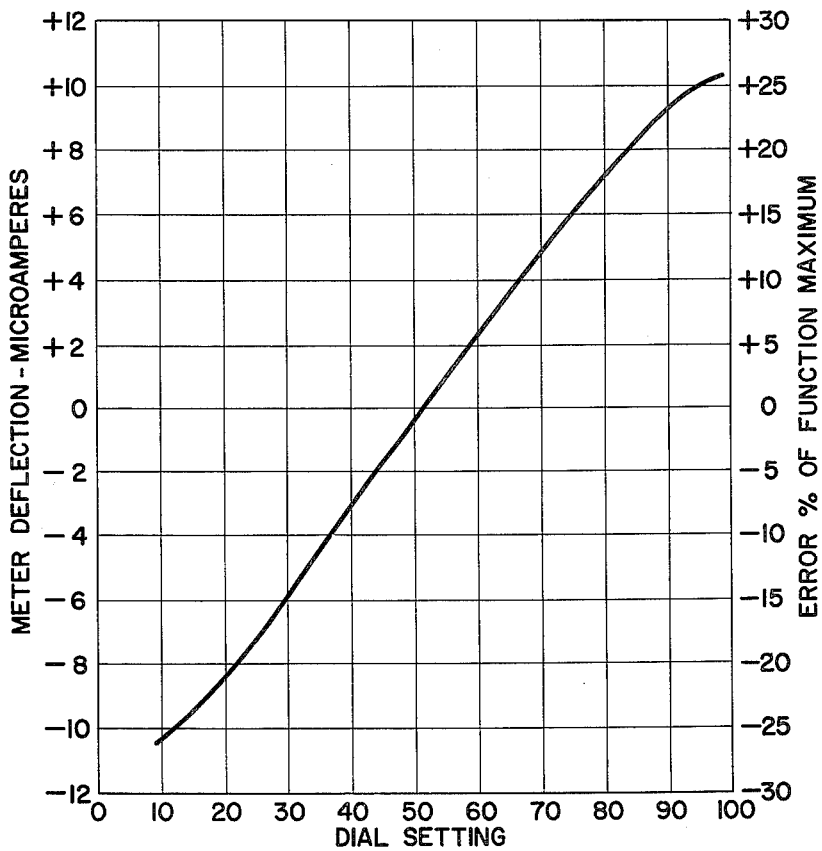
FIG. 6 shows representation of an error function by a dial reading.

FIG. 6 shows graphically the error function that might be read into the system by arbitrarily setting the dial which controls circuit $C_6$. The meter deflections M are shown at the left and the percentage value of the error, as compared with the maximum value to be obtained in the study is shown at the right. The dial setting is indicated at the bottom.

Instead of having the normal distribution curve error set into the system by an independent human operator, this can be done by automatic means. An electronic device, a normal distribution curve generator, is shown in FIG. 8 for this purpose. The device is made up of a plurality of components of the type shown in FIG. 7.

Figure 7:
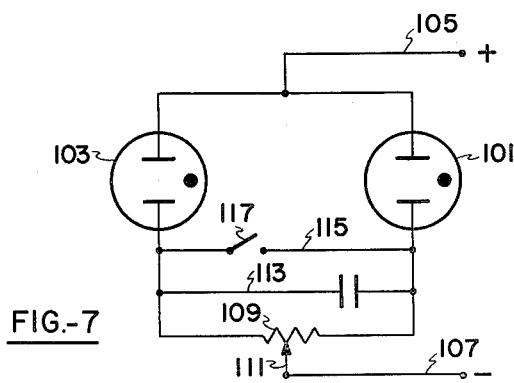
FIG. 7 shows a single unit component of an automatic error selector.
Figure 8:
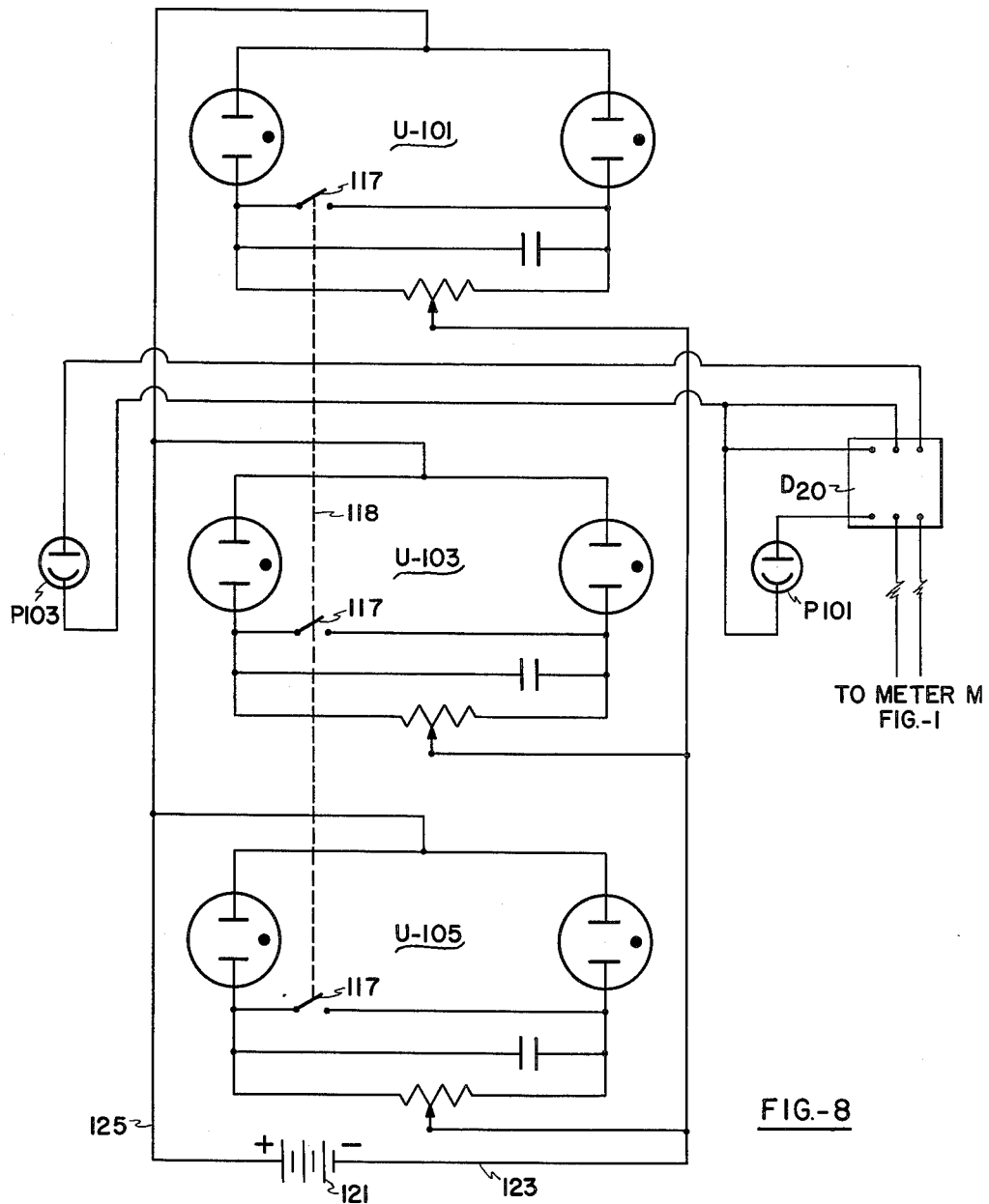
FIG. 8 shows an automatic random error selector made up of a plurality of the units of FIG. 7.

Referring to FIG. 7, there are shown two gas discharge tubes, such as neon bulbs 101 and 103. A voltage is impressed across leads 105 and 107. The respective neon tubes are connected to lead 105 and are also connected together by a resistance 109 which makes contact with a movable contact element 111 attached to the line 107. By this means the voltage impressed on the respective gas discharge tubes 101 and 103 may be varied.

A condenser 113 is connected in parallel with resistance 109 and this may be shorted out by another parallel circuit 115 having a switch 117.

When the switch 117 is open the impressed voltage causes a charge to build up on condenser 113. Ultimately one of the gas discharge tubes 101 or 103 flashes and discharges the condenser on its side. The charge then builds up on the opposite side until the other gas discharge tube discharges, and thus an oscillating circuit is established with the gas discharge tubes flashing alternately at a frequency that may be varied from a few to many hundred cycles per second. The oscillation is of sufficiently high frequency that when the switch 117 is closed to keep one of the gas discharge tubes on, and the other shut off, it is not possible for the operator of the switch to exercise control over which gas discharge tube will be kept glowing.

Referring now to FIG. 8, there are shown three units like FIG. 7 connected in parallel. Appropriate voltage is impressed on all three circuits by a battery 121 through leads 123 and 125. The units U–101, U–103 and U–105 operate exactly like the single unit in FIG. 7. Each of them has a switch 117, the switches all being ganged together at 118. When the switches are closed the operator has no way of deciding which tubes will be kept glowing because the frequency of oscillation in each of the units is too rapid for him to make any selection by choice. He may by chance close the circuits at a time when all three of the tubes on the right are glowing or he may catch all three units on the left glowing. On the other hand, he may catch one or two on one side and two or one on the other. Obviously, for greater selectivity and more complete random distribution, the number of units should be greater than three and normally will be several times that number. For simplicity of explanation, however, only three are shown.

It will be understood, then, that when the operator closes the gang switches 117, 118, certain tubes will be lighted, the distribution being according to the probability curve. By measuring the current passing through the discharge tubes or the amount of light generated on each side of the apparatus, the random error introduced into meter M, FIG. 1, may be thrown into the circuit without any premeditated control as to its magnitude or polarity.

In FIG. 8 a simple means for measuring the magnitude of the error is provided. The amount of light on each side of the unit is measured by a photocell P–101 or P–103. It will be understood that the gas discharge tubes will be arranged sufficiently close to the photocell and the light therefrom directed towards it so that each photocell will measure only the light from the tubes on its side of the device. If only the discharge tubes on the right are glowing, the tube P–101 will register maximum current and introduce the maximum error of one predetermined polarity. Similarly, the maximum error of opposite polarity will be introduced when the photocell P–103 shows all of the tubes on its side to be lighted. Errors of lesser absolute values will be introduced when some of the tubes on both sides are lighted.

Alternatively, the current may be measured in each blank of gas discharge tubes after switch 117 is closed. The relative amount of current flowing is a measure of the number of gas discharge tubes remaining lighted in each bank and can be used as a measure of the part of the normal distribution curve selected. This is transmitted to meter M, FIG. 1, through a control device $D_{20}$ and superimposed on the current from the units under direct operator control.

By the means just described, an error within the desired limits of magnitude may be introduced into the system. Since the magnitude will vary for different problems, the current from the photocell to the meter M may be amplified to varying degrees for each problem. Means for such amplification are obvious to those skilled in the art and are not shown on the drawings. It will be noted that the output of the device of FIG. 8 can be connected to the meter M of FIG. 1.

The manner in which the normal distribution curve error is introduced will vary, depending upon the particular application of the analog demonstrator. In some cases, the output from the normal distribution curve generator is connected directly to the output circuit of the analog demonstrator through a control device $D_{20}$ so that each analog demonstrator output reading contains an error factor. In other cases, the output from the normal distribution curve generator is noted by an operator, before the error factor is introduced into the system. By methods obvious to those skilled in the art, the output from the normal distribution curve generator as well as the output from the analog demonstrator can be automatically recorded, along with the corresponding dial settings.

In applying the system to study of a concrete problem, various operators and teams of operators are found to vary in their skills. In a simulated process for producing a synthetic alcohol from raw materials, for example, it was postulated that an expected yield of 24% was being obtained with a standard group of settings, but that a higher yield, something less than 50%, was theoretically possible. It was determined that there were five known variables, $X_1$ being important with a maximum at about 18, $X_2$ with a maximum around 67, $X_3$ less important, essentially linear, with a maximum at about 94, $X_4$ of no effect in the present example, and $X_5$ almost linear, maximum at about 95. A standard deviation of 4% constant throughout the yield range was postulated. It was desired to increase the yield by doing empirical research work. Assuming that each plant test costs $20,000 and that a 1% improvement in yield is worth $50,000 per year, or $500,000 over a predicted ten-year life of the plant, the problem was presented to the research teams to improve the plant yield, i.e. to determine what research could be done and how long it should be continued.

Obviously, if the reseracher could get a yield improvement of 10% after 50 tests, he would have earned 4 million dollars net, or $5.00 for each research dollar spent. Another, after only 4 tests costing 80 thousand dollars might get a 2% improvement with 1 million dollars or $12.50 for each reserach dollar, but far below the potential. This shows that returns per dollar spent are not necessarily the best criterion for judging the efficiency of research.

Strategy in research work can be studied by this method, e.g. whether the one-variable at a time technique or a bolder strategy of predetermining several values at once is the most profitable. The superimposition of the random error is realistically frustrating to the research team but it is deemed essential. The random error in either case is selected according to the law of probability, with appropriate limits, and is not under control of the operator, or at least not under control of the primary operator.

The apparatus and the method of using it obviously are adaptable to various problems, such as plant operations, underground flow of oil deposits, economic operations of various types, etc. Many variations in details of equipment and in method of their use will appear obvious to those skilled in the art. It is intended to cover such herein so far as the prior art permits.

What is claimed is:

1. Apparatus of the character described for studying commercial operations comprising, in combination, (1) physically adustable means for simulating the variations in at least two known variables which effect overall results of said operations, (2) means for reading out simulated overall results, (3) means for transmitting the said variations to said overall results as said physical means are adjusted, and (4) means for imposing upon said overall results the effect of at least one unknown variable of known limits, within said limits, to determine the relative effects of the known and unknown variables, said last named means being adapted to determine the value of an unknown variable within normal probability limits independently of control of a human operator, and including a pair of opposed banks of gas discharge tubes adapted to operate alternately, intermittently and individually at rapid intervals so as to render premeditated selection of a current value in either bank substantially impossible.

2. In combination, (1) an ammeter read-out device having connected circuit means, (2) a series of variable potentiometers and associated voltage sources so connected to said circuit means that each of said variable potentiometers and its associated voltage source is adapted to impress a variable potential on said circuit means to cause the reading of said read-out device to vary according to a known variable in a commercial process, and (3) an independent means for impressing a superimposed potential on said read-out device, said last-named means being variable at random and within experimentally determined limits to simulate the effects of unknown variables on the overall process, and comprising a pair of opposed banks of alternately glowing gas discharge tubes adapted to pass intermittent electric current at rapid intervals.

References Cited in the file of this patent

UNITED STATES PATENTS

| | | |
|---|---|---|
| 1,923,696 | Willis | Aug. 22, 1933 |
| 2,359,747 | Carleton | Oct. 10, 1944 |
| 2,469,011 | Smith | May 3, 1949 |
| 2,509,718 | Barbey | May 30, 1950 |
| 2,539,014 | Frantz | Jan. 23, 1951 |
| 2,636,285 | Fogarty et al. | Apr. 28, 1953 |
| 2,678,163 | Roberts et al. | May 11, 1954 |
| 2,686,876 | Mills | Aug. 17, 1954 |
| 2,768,298 | Hendrix et al. | Oct. 23, 1956 |
| 2,925,667 | Fogarty | Feb. 23, 1960 |

OTHER REFERENCES

Electronic Instruments (Chance et al.), published by McGraw-Hill Book Company (New York), 1948. (Page 139 relied on. Copy in Scientific Library and in Div. 23.)

Electronic Analog Computers (Korn et al.), published by McGraw-Hill Book Co. (New York), 1952. (Page 257 relied on. Copy in Scientific Library and in Div. 23.)

Computing Circuits and Devices for Industrial Process Functions (Hornfick), Trans. of AIEE, vol. 71, Part I, 1952. (Page 189 relied on. Copy in Scientific Library and in Div. 23.)